US009178816B1

(12) United States Patent
Ojha et al.

(10) Patent No.: US 9,178,816 B1
(45) Date of Patent: Nov. 3, 2015

(54) CONTROL PLANE MESSAGING IN ALL-ACTIVE MULTI-HOMED ETHERNET VIRTUAL PRIVATE NETWORKS

(71) Applicant: Juniper Networks, Inc., Sunnyvale, CA (US)

(72) Inventors: Deepak Ojha, Sunnyvale, CA (US); Shrinivasa Kini, Santa Clara, CA (US); Pankaj Shukla, San Jose, CA (US); Manoj Sharma, Cupertino, CA (US); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 209 days.

(21) Appl. No.: 14/040,487

(22) Filed: Sep. 27, 2013

(51) Int. Cl.
*H04W 8/00* (2009.01)
*H04L 12/741* (2013.01)

(52) U.S. Cl.
CPC ..................... *H04L 45/74* (2013.01)

(58) Field of Classification Search
USPC .................................. 370/392, 253
See application file for complete search history.

(56) References Cited

U.S. PATENT DOCUMENTS

| 8,125,926 | B1 | 2/2012 | Kompella |
| 8,593,973 | B2 | 11/2013 | Shukla et al. |
| 8,644,134 | B2 | 2/2014 | Sajassi et al. |
| 8,811,181 | B2 | 8/2014 | Osswald |
| 8,953,590 | B1 | 2/2015 | Aggarwal et al. |
| 2012/0147737 | A1 | 6/2012 | Taylor et al. |
| 2012/0236750 | A1 | 9/2012 | Bugenhagen et al. |
| 2013/0235876 | A1 | 9/2013 | Sajassi et al. |
| 2013/0254359 | A1 | 9/2013 | Boutros et al. |
| 2014/0029419 | A1 | 1/2014 | Jain et al. |
| 2014/0241247 | A1 | 8/2014 | Kempf et al. |

*Primary Examiner* — Dang Ton
*Assistant Examiner* — Pamit Kaur
(74) *Attorney, Agent, or Firm* — Shumaker & Sieffert, P.A.

(57) ABSTRACT

In general, techniques are described for providing control plane messaging in an active-active (or all-active) configuration of a multi-homed EVPN environment. In some examples, the techniques include receiving a control plane message comprising at least one address that identifies that second PE network device. The techniques may include configuring, based at least in part on the control plane message, a forwarding plane of a first PE network device to identify network packets having respective destination addresses that match the at least one address. The techniques may include determining that at least one address of the network packet matches the at least one address that identifies the second PE network device. The techniques may include, responsive to the determination, skipping a decrement of the Time-To-Live (TTL) value of the network packet, and forwarding the network packet to the second PE network device.

20 Claims, 5 Drawing Sheets

CONTROL PLANE MESSAGING IN ALL-ACTIVE MULTI-HOMED ETHERNET VIRTUAL PRIVATE NETWORKS

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the network devices.

In some examples, EVPNs may include one or more Ethernet Segments. An Ethernet Segment generally may include one or more EVPN instances (EVIs), that each represents a different virtual layer two network with separate forwarding domains. In some examples, an Ethernet Segment may include a CE network device that is multi-homed to multiple PE network devices, such that network links between the PE network device and the CE network device may operate as a single logical network link for transmitting network traffic. In EVPNs, a PE network device typically uses the Border Gateway Protocol (BGP) (i.e., an L3 routing protocol) to perform control plane messaging. For example, a PE network device may announce its presence within an Ethernet Segment by sending an Ethernet Auto-Discovery route using BGP to a multi-homed CE network device. In other examples, a PE network device may advertise to other provider edge network devices MAC addresses learned from local consumer edge network devices to which the PE network device is connected.

In some examples, a customer network includes a CE network device that is multi-homed to multiple PE network devices in a service provider network. The customer network may include hosts and other network devices that send traffic through the CE network device to PE network devices in the service provider network. As one example, a network device within the customer network may run one or more link-state protocols such as Intermediate System-to-Intermediate System Protocol (ISIS) and/or Open Shortest Path First (OSPF). The PE network devices may also similarly run such link-state protocols and exchange control plane messages with the network device within the customer network via the CE network device. Control messages may be uni- or multi-casted between the PE routers and the network device within the customer network. Such control plane messages may have time-to-live (TTL) values of 1 because the network device within the customer network assumes that the PE network devices are a single hop away from the network device.

In active-active (or all-active) configuration, the CE network device runs a load-balancing algorithm to evenly distribute the flow of network packets across all available PE network devices in an EVI of an Ethernet Segment. However, the CE network device may not treat network packets differently based on the packet header or packet contents when running the load-balancing algorithm to forward network packets to the Ethernet segment. Consequently, when a network device within the customer network sends a control plane message destined for one of the PE network devices, the CE network device may, due to its load-balancing algorithm, send the control plane message to a PE network device in the Ethernet Segment that is not the intended destination PE network device. The PE network device that receives the control message may decrement the message TTL value to 0, which causes the packet to be dropped before reaching the intended destination PE network device.

SUMMARY

The techniques described herein are directed to providing control plane messaging in an active-active (or all-active) configuration of a multi-homed EVPN environment. In one example, an EVPN environment includes a CE network device of a customer network that is multi-homed to a group of PE network devices of a service provider network. The group of PE network devices may be collectively configured as an Ethernet segment identifiable by the CE network device. The PE network devices may operate in active-active mode such that the CE network device runs a load balancing algorithm to evenly distribute network traffic from hosts and network devices in the customer network to the PE network devices. In accordance with techniques of the disclosure, the PE network devices may initially perform a synchronization process to exchange MAC and IP address information of each respective PE network device with other PE network devices in the Ethernet segment.

Each PE network device updates its forwarding plane to identify network packets during ingress lookups having destination MAC and IP addresses that match corresponding addresses of other PE network devices in the Ethernet segment. If the PE network device determines that the MAC and IP addresses match another PE network device in the Ethernet segment, the PE network device will not decrement the TTL value of the network packet. By refraining from decrementing the TTL value, the PE network device will not drop the network packet and instead forward it to the intended destination PE device matching the MAC and IP address of the packet. That is, even though the CE network device running a load-balancing algorithm may initially send a unicast control plane message to a PE network device that does not match the destination MAC and IP addresses of the message, the receiving PE network device in the same Ethernet segment may correctly forward the control plane message to the intended destination PE network device by refraining from decrementing the TTL value. In this way, even though hosts or other network devices in the customer network assume that PE network devices are only a single hop away, control plane messages to the PE network devices in the Ethernet segment are correctly forwarded to the intended destination PE network device. Thus, techniques of the present disclosure may provide for improved control plane messaging in active-active, multi-homed EVPN environments.

In one example, a method includes receiving, by a first provider edge (PE) network device and from a second PE network device of a plurality of PE network devices that provide an active-active configuration for an Ethernet segment, a control plane message comprising at least one address that identifies that second PE network device. The method may also include configuring, by the first PE network device and based at least in part on the control plane message, a forwarding plane of the first PE network device to identify network packets having respective destination addresses that match the at least one address. The method may also include, responsive to receiving a network packet, determining by the forwarding plane of the first PE network device, that at least one address of the network packet matches the at least one address that identifies the second PE network device. The method may also include, responsive to the determination, skipping, by the forwarding plane of the first PE network device, a decrement of the Time-To-Live (TTL) value of the network packet, and forwarding the network packet to the second PE network device.

In one example, a network device that is a first provider edge (PE) network device includes a network interface that receives, from a second PE network device of a plurality of PE network devices that provide an active-active configuration for an Ethernet segment, a control plane message comprising at least one address that identifies that second PE network device. The network device may also include an Ethernet Virtual Private Network (EVPN) module that configures, based at least in part on the control plane message, a forwarding plane of the first PE network device to identify network packets having respective destination addresses that match the at least one address. The EVPN module may, responsive to receiving a network packet, determines by the forwarding plane of the first PE network device, that at least one address of the network packet matches the at least one address that identifies the second PE network device. The EVPN module may, responsive to the determination, skips, by the forwarding plane of the first PE network device, a decrement of the Time-To-Live (TTL) value of the network packet, and forwarding the network packet to the second PE network device.

In one example, a method includes, receiving, by a network device and from a second network device of a plurality of network devices that provide an all-active configuration in which the plurality of network devices operate as a logical network link, a control plane message comprising a first identifier that identifies that second network device. The method may also include configuring, by the first network device and based at least in part on the control plane message, a forwarding plane of the first network device to identify network packets having a second identifier that matches the first identifier. The method may also include responsive to receiving a network packet, determining by the forwarding plane of the first PE network device, the network packet includes the second identifier that matches the first identifier that identifies the second PE network device. The method may also include, responsive to the determination, skipping, by the forwarding plane of the first PE network device, a decrement of the Time-To-Live (TTL) value of the network packet, and forwarding the network packet to the second network device.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
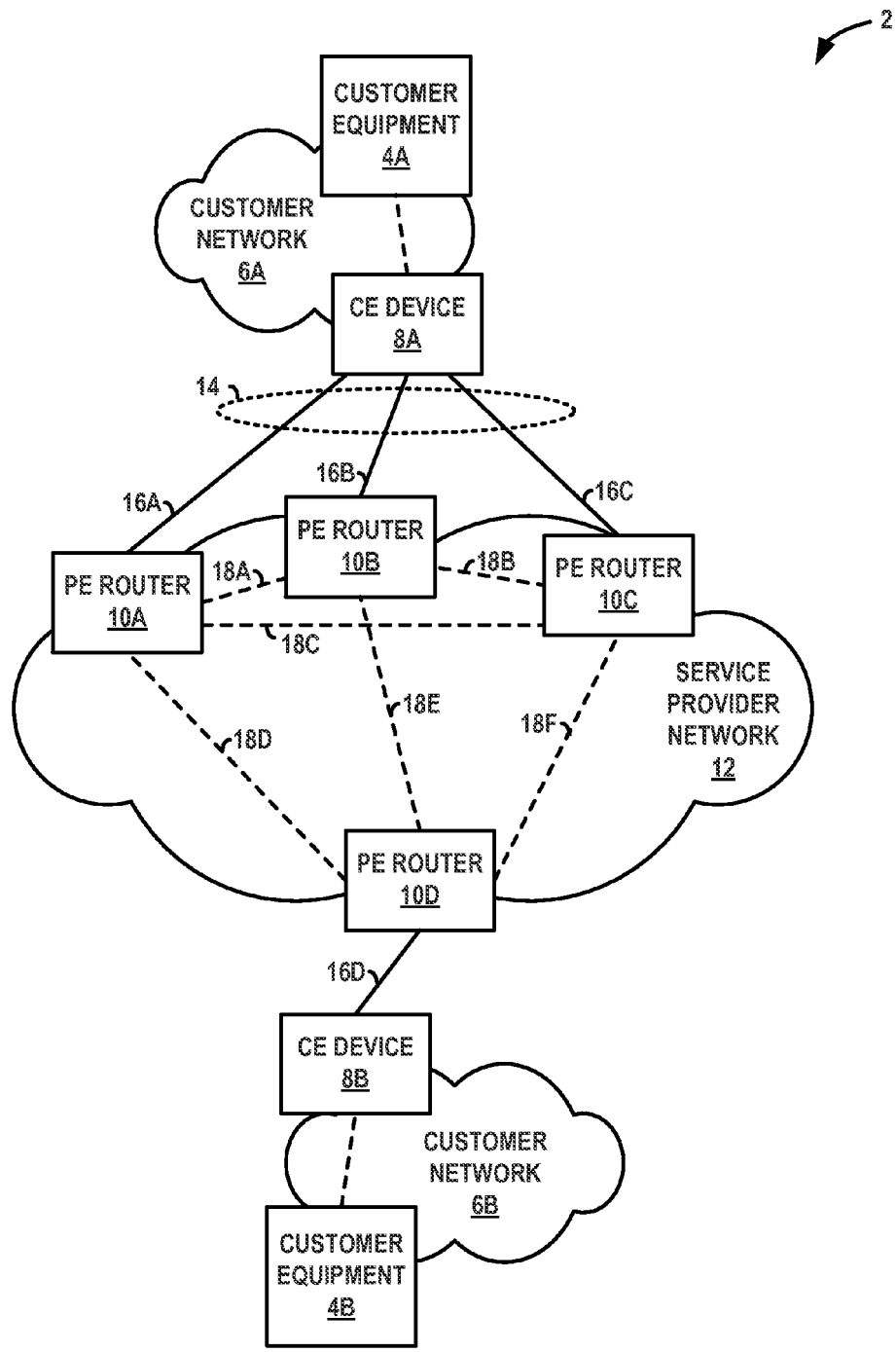
FIG. 1 is a block diagram illustrating an example system for providing control plane messaging in an active-active (or all-active) configuration of a multi-homed EVPN environment, in accordance with techniques of the disclosure.

FIG. 1 is a block diagram illustrating an example system for providing control plane messaging in an active-active (or all-active) configuration of a multi-homed EVPN environment, in accordance with techniques of the disclosure. In the example of FIG. 1, PE routers 10A-10D ("PE routers 10") provide customer networks 6A-6B ("customer networks 6") with access to service provider network 12 via CE devices 8A-8B ("CE devices 8"). Network links 16A-16D may be Ethernet, ATM or any other suitable network connections. Network links 18A-18F represent one or more network links within service provider network 12 that operatively couple PE routers 10A-10D, and in some examples additional hosts and/or network devices, together.

PE routers 10 and CE routers 8 are illustrated as routers in the example of FIG. 1; however, techniques of the disclosure may be implemented using switches or other suitable network devices. Moreover, although techniques of the disclosure are described with respect to EVPN for example purposes, the techniques may be applied in other layer-2 networking environments. For instance, same techniques described here can be adopted for use in other all-active multi-homing techniques such has multi-chassis Link Aggregation Groups (LAGs) as further described herein.

Customer networks 6 may be networks for geographically separated sites of an enterprise. Each of customer networks 6 may include additional customer equipment 4A-4B ("customer equipment 4"), such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely exemplary. For example, an enterprise may include any number of customer networks 6. Nonetheless, for ease of description, only customer networks 6A-6B are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other. Service provider network 12 may include a variety of network devices other than PE routers 10. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, 18 such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes Ethernet Virtual Private Network (EVPN). EVPN is a service that provides a form of L2 connectivity across an intermediate network, such as service provider network 12, to interconnect two L2 customer networks, such as L2 customer networks 6, that are usually located in two different geographic areas. Often, EVPN is transparent to the customer networks in that these customer networks are not aware of the intervening intermediate service provider network and instead act and operate as if these two customer networks were directly connected. In a way, EVPN enables a form of a transparent LAN connection between two geographically distant customer sites that each operates a L2 network and, for this reason, EVPN may also be referred to as a "transparent LAN service."

To configure an EVPN, a network operator of the service provider configures various devices included within service provider network 12 that interface with L2 customer networks 6. The EVPN configuration may include an EVPN instance (EVI), which consists of one or more broadcast domains. Generally, an EVI may refer to a routing and forwarding instance on a PE router. Consequently, multiple EVIs may be configured for Ethernet segment 14, as further described herein, each providing a separate, logical layer two (L2) forwarding domain. In this way, multiple EVIs may be configured that each includes one or more of PE routers 10A-10C of Ethernet segment 14. In some examples, Ethernet Tags are then used to identify a particular broadcast domain, e.g., a VLAN, in an EVI. A PE router may advertise a unique EVPN label per <ESI, Ethernet Tag> combination. This label assignment methodology is referred to as a per <ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment.

In the example of FIG. 1, for use in transporting communications associated with one or more EVIs, the network operator configures each of PE routers 10 to provision label-switched paths (LSPs) implemented using Multiprotocol Label Switching (MPLS). Although not shown in FIG. 1, EVPN may operate over such LSPs to enable a logical form of L2 connectivity. LSPs are logical network connections that emulate a connection not natively offered by service provider network 12 for consumption outside the boundaries of that service provider network 12. LSPs may emulate a L2 connection within service provider network 12 enabling service provider network 12 to offer emulated L2 connectivity externally for consumption by L2 customer networks 6.

To configure an EVI, LSPs may be configured such that each of PE routers 10 that provide EVPN for consumption by the subscribing entity is interconnected by way of LSPs to every other one of the PE devices that provide EVPN for consumption by the subscribing entity. In the example of FIG. 1, each of PE routers 10 provides access to the EVPN for carrying traffic associated with customer networks 6. As one example, each of PE devices 10A-10C within the same Ethernet segment may be connected to every other PE device 10A-10C via LSPs. Once LSPs are configured in this manner, EVPN may be enabled within PE devices 10 to operate over the LSPs, which may in this context operate as logical dedicated links through service provider network 12. In operation, EVPN generally involves prepending or otherwise inserting one or more MPLS tags onto incoming L2 packets, which may also be referred to as L2 frames (particularly in the context of Ethernet), and transmitting the tagged packets through a corresponding one of the configured LSPs. Once EVPN is configured within service provider network 12, customer devices 4 within customer networks 6 may communicate with one another via EVPN as if they were directly connected L2 networks.

In the example of FIG. 1, when providing the EVPN service to customer networks 6, PE routers 10 and CE devices 8 typically perform MAC address learning to efficiently forward L2 network communications in system 2. That is, as PE routers 10 and CE devices 8 forward Ethernet frames, the routers learn L2 state information for the L2 network, including media access control (MAC) addressing information for customer equipment 4 within the network and the physical ports through which customer equipment 4 are reachable. PE routers 10 and CE devices 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC address for customer equipment 4 reachable through local attachment circuits, the PE routers 10 utilize route advertisements of a layer three (L3) routing protocol (i.e., BGP in this example) to share the learned MAC addresses and to provide an indication that the MAC addresses are reachable through the particular PE router that is issuing the route advertisement. In the EVPN implemented using PE routers 10 for a given EVI, each of PE routers 10 advertises the locally learned MAC addresses to other PE routers 10 using a BGP route advertisement, also referred to herein as a "MAC route" or a "MAC Advertisement route." As further described below, a MAC route typically specifies an individual MAC address of customer equipment 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN.

As shown in FIG. 1, CE devices 8 may be multi- and/or singly-homed to one or more of PE routers 10. In EVPN, a CE router may be said to be multi-homed when it is coupled to two physically different PE routers on the same EVI when the PE routers are resident on the same physical Ethernet Segment. As one example, CE device 8A is coupled to PE routers 10A, 10B, 10C via links 16A, 16B, and 16C, respectively, where PE routers 10A, 10B, and 10C are capable of providing access to EVPN for L2 customer network 6A via CE device 8A. In instances where a given customer network (such as customer network 6A) may couple to service provider network 12 via two different and, to a certain extent, redundant links, the customer network may be referred to as being "multi-homed." In this example, CE device 8A may be multi-homed to PE routers 10A, 10B, and 10C because CE device 8A is coupled to three different PE routers 10A, 10B, and 10C via separate and, to a certain extent, redundant links 16A, 16B, and 16C, where all of PE routers 10A, 10B, and 10C are capable of providing access to EVPN for L2 customer network 6A. Multi-homed networks are often employed by network operators so as to improve access to EVPN provided by service provider network 12 should a failure in one of links 16A, 16B, 16C occur.

As shown in FIG. 1, a CE and/or PE network device, such as CE device 8A may be multi-homed to two or more PE network devices that collectively comprise an "Ethernet segment." For instance, in the example of FIG. 1, PE routers 10A-10C are included in Ethernet segment 14. Moreover, physical links 16A, 16B and 16C of Ethernet segment 14 may appear to routing and forwarding functions within CE device 8A as a Link Aggregation Group (LAG), i.e., a single logical link. Ethernet segments have an identifier, called the "Ethernet Segment Identifier" (ESI), which may be encoded as a ten octet integer. In general, an Ethernet segment uses a non-reserved ESI that is unique network wide (e.g., across all EVPNs on all the PEs). In some examples, a network operator may manage ESIs throughout the EVPN to ensure unique network wide ESIs for respective Ethernet segments. In other examples, ESIs may be allocated automatically. In this example of FIG. 1, Ethernet segment 14 includes PE routers 10A-10C and CE device 8A, and Ethernet segment 14 may be associated with a unique ESI. As described above, one or more EVIs may be configured for a single Ethernet segment. That is, multiple EVIs may be configured for Ethernet segment 14 and each respective EVI may include one or more of PE routers 10A-10C.

Using ESIs, PE routers 10 may share learned MAC addresses by sending MAC Advertisement routes that specify, among other information, a learned MAC address and a corresponding ESI. In this way, PE routers may maintain tables of MAC addresses associated with corresponding ESIs. Consequently, a PE router that receives and maintains MAC addresses that were previously learned by other PE routers can determine that a MAC route is accessible through multiple PE routers that are associated with the same ESI.

As described above, PE routers 10 may use control plane signaling with different route types to provision the EVPN service in service provider network 12. EVPN defines BGP Network Layer Reachability Information (NLRI), and in particular, defines different route types. The EVPN NLRI is carried in BGP using BGP Multiprotocol Extensions. Route types include but are not limited to: Ethernet Auto-Discovery (AD) routes, MAC advertisement routes, and Ethernet Segment Routes. AD routes, for example, specify a Route Distinguisher (RD) (e.g., an IP address of an MPLS Edge Switch (MES)), ESI, Ethernet Tag Identifier, and MPLS label. MAC advertisement routes include a RD, ESI, Ethernet Tag Identifier, MAC address and MAC address length, IP address and IP address length, and MPLS label. An Ethernet Segment route includes a Route Distinguisher and Ethernet Segment Identifier.

PE routers 10 may share NLRI to configure one or more Ethernet segments and share MAC routes that are learned by the respective devices. In general, PE routers connected to the same Ethernet segment can automatically discover each other with minimal to no configuration through the exchange of the Ethernet Segment route using BGP. In multi-homed environments, each PE router may initially advertise an Ethernet AD route per Ethernet segment for each locally attached segment. The Ethernet AD route may advertise the presence of the PE router within an Ethernet segment. Each PE router may also perform an EVPN gateway MAC synchronization process. The EVPN gateway MAC synchronization feature allows a PE router to exchange its gateway MAC address and gateway IP address with other PE routers of an Ethernet segment using the BGP. In this way, all the PE routers which are part of the Ethernet segment receive the capabilities to route the IP packets on the gateway MAC addresses of each other. While the virtual machines may send the traffic for routable IP addresses, the layer-3 control protocol packets are destined for IP addresses of the PEs.

In some examples, PE routers 10A-10C may operate in "active-active mode" or "single-active mode" when forwarding network packets between PE router 10D and CE device 8A. In active-active mode (or "all-active" mode), PE routers 10A-10C each operate concurrently to forward traffic between CE device 8A and PE router 10D for a given EVI. In one example of active-active mode, all of PE routers 10A-10C in such a redundancy group can forward traffic to/from PE router 10D for a given EVI. By contrast, in single-active mode (or "active/standby" mode), when CE device 8A is multi-homed to two or more PE routers, such as PE routers 10A-10C, only a single PE router in such a redundancy group may forward traffic for the CE router to/from remote PE router 10D for a given EVI.

In an all-active configuration. CE device 8A may run a load-balancing algorithm to evenly distribute forwarding of network packets to PE routers included in an Ethernet segment. For instance, CE device 8A may perform a hashing function one or more types of information included in the packet header of a network packet. Types of information may include layer 2 and/or layer three addresses. The addresses may be source and/or destination addresses. In other examples, port, protocol or other suitable information included in a network packet may be used in the hashing function. In still other examples, any combination of different types of information may be used in the hash function. In any case, CE device 8A may determine, based on the generated hashcode, an index corresponding to an egress interface of CE device 8A that is operatively coupled to one of the PE routers in the Ethernet segment. In this way, CE device 8A may evenly distribute the forwarding of network packets to different PE routers included in the Ethernet Segment.

In some examples, network packets forwarded by CE device 8A to PE routers 10A-10C may originate from customer equipment 4A. As previously described, customer equipment 4A may include hosts and network devices, among other computing devices. In an example where customer equipment 4A is a network device, customer equipment 4A may run one or more protocols. In some examples, protocols may include, but are not limited to, link-state protocols such as ISIS and OSPF. A link state protocol may allow every network device to generate a map of the connectivity to a network. Each network device may then determine the next best logical path from it to every possible destination in the network. To enable network devices to generate a map of the connectivity to a network, the network devices may send control plane messages to one another to discover paths and nodes in the network. Therefore, customer equipment 4A may exchange control plane messages with, for example, PE routers 10A-10C.

Generally, control plane messages may use a TTL field in the IP header to prevent the packet from going beyond one hop. Thus, control plane message TTL values are generally set to 1 when routing protocol packets are sourced because customer equipment 4A within customer network 6A assumes that PE routers 10 are a single hop away from one another. However, customer equipment 4A may not be aware of CE device 8A because CE device 8A is a layer 2 switch. Consequently, although customer equipment 4A may send a unicast control plane message to PE router 10A that includes a TTL value of 1, customer equipment 4A may not be aware that CE device 8A is executing a load-balancing algorithm that may forward the network packet to, for example, CE device 8B that is not the intended destination for the control plane message.

Rather than decrementing the TTL value to 0 and dropping the network packet at the receiving PE router that is not the intended destination PE router, the receiving PE router may during an ingress lookup determine whether the destination MAC and IP addresses of the network packet match the destination MAC and IP addresses of one of PE routers 10A-10C in Ethernet segment 14. In accordance with techniques of the disclosure, if the MAC and IP addresses of the network packet match one of PE routers 10A-10C that are in the same Ethernet segment 14, the receiving PE router will skip decrementing the TTL value of the network packet and forward the network packet to the intended destination PE router. By refraining from decrementing the TTL values on network packets that are intended for other PE routers within Ethernet segment 14, the receiving PE router can identify the network packet and forward it to the intended destination PE router even if CE device 8A initially sends the network packet to a PE router other than the intended destination PE router due to load-balancing. In this way, control plane messages having TTL values of 1 that are forwarded by CE device 8A to PE routers 10A-10C are not dropped although the control plane messages may initially be forwarded to a PE router that is not the intended destination. As described below, PE routers 10A-10C in Ethernet segment 14 can identify such network packets by configuring each of its forwarding planes to identify MAC and IP addresses of the respective PE routers in the same Ethernet segment based on information exchanged initially during the EVPN gateway MAC synchronization process. Thus, if a network packet is received by a PE router at one of its ingress interfaces that is operatively coupled to a multi-homed CE network device, and the network packet is destined to another PE router in the same multi-homed group (e.g., same Ethernet segment), the receiving PE router may refrain from decrementing the TTL value of the network packet and forward it to the destination PE router.

In operation, PE routers 10A-10C at initial configuration and startup initially announce their respective presences within the EVPN of system 2. In particular, each of PE routers 10A-10C may send Ethernet Auto-Discovery routes to CE device 8A that indicate the availability of PE routers 10A-10C in Ethernet segment 14. A network administrator may configure PE routers 10A-10C and CE router 8A to operate in active-active mode, such that CE router 8A evenly distributes the flow of network packets to each of PE routers 10A-10C in Ethernet segment 14. In some examples, the active-active mode configuration may be applied on a per-EVI basis within Ethernet segment 14.

Each of PE routers 10A-10C may also perform an EVPN gateway MAC synchronization process. In the EVPN gateway MAC synchronization process, PE routers 10A-10C may exchange control plane messages that comprise information such as the MAC address and IP address of the respective PE routers. In some examples, the information may include an Ethernet Segment Identifier (ESI) that identifies the Ethernet segment. For example, during the EVPN gateway MAC synchronization process, PE router 10A may receive from PE router 10B a control plane message comprising at least one address that identifies PE router 10B. For instance, the control message may include information indicating the MAC address and IP address of PE router 10B. The control plane message may also include the ESI for Ethernet segment 14 to which PE routers 10A-10C belong. PE router 10B may send a similar control plane message to PE router 10C in Ethernet segment 14. In this way, each of the PE routers performing EVPN gateway MAC synchronization may determine the information, such as MAC and IP addresses, that identify other PE routers in Ethernet segment 14.

In accordance with techniques of the disclosure, each PE router of Ethernet segment 14 configures its respective forwarding plane to identify network packets that have destination addresses that match other PE routers of Ethernet segment 14. For instance, PE router 10A may, based on information received from PE router 10B, configure its forwarding plane to identify network packets having one or more destination addresses that match at least one address of PE router 10B included in Ethernet segment 14. That is, PE router 10A may configure its forwarding plane to perform an ingress lookup and determine whether one or more destination addresses of the network packet match at least one destination address of PE router 10B. In some examples, PE router 10A configures its forwarding plane for ingress interfaces are included in a multi-homed group, and therefore may receive network packets from CE device 8A that is multi-homed in Ethernet segment 14 to PE routers 10A-10C. In some examples, PE router 10A store an association between the ESI of Ethernet segment 14 and the MAC and IP addresses of PE routers 10B-10C that were received by PE router 10A during the EVPN synchronization process.

In the current example, PE router 10A may configure its forwarding plane to perform an ingress lookup on a network packet and determine whether the destination MAC and IP addresses of the network packet match the destination MAC and IP addresses of one of PE routers 10B, 10C. PE router 10A may configure one or more forwarding next hops corresponding to the MAC and IP addresses of PE routers 10B, 10C to skip decrementing the TTL values of network packets having matching destination MAC and IP addresses. The forwarding next hops may further specify respective egress interfaces of PE router 10A that correspond to network links that operatively couple to PE routers 10B, 10C. Consequently, when the forwarding plane of PE router 10A performs an ingress lookup based on the destination MAC and IP address of a network packet and determines a match with, for example, PE router 10B, the forwarding plane may skip decrementing the TTL value of the network packet and forward the network packet out the egress interface that corresponds to PE router 10B. In some example, to skip decrementing the TTL value may include refraining from decreasing a TTL value by an integer value of 1.

To further illustrate, customer equipment 4A may initially send a unicast OSPF control plane message to CE device 8A that includes a destination MAC and IP address of PE router 10B. CE device 8A, configured to use Ethernet segment 14 in active-active mode, may be executing a load-balancing algorithm that evenly distributes the flow of network packets to each of PE routers 10A-10C. Upon receiving the network packet, CE device 8A may apply a hash function to the destination MAC and IP address of the control plane message. CE device 8A may determine that the resulting hashcode corresponds to an egress interface that operatively couples CE device to PE router 10A. Consequently, CE device 8A forwards the control plane message to PE router 10A rather than the intended destination PE router 10B.

PE router 10A receives the control plane message at an ingress interface via network link 16A. Responsive to receiving the control plane message, PE router 10A may perform an ingress lookup based information included in the header of the control plane message. Specifically, the forwarding plane of PE router 10A may perform an ingress lookup and determine that the destination MAC and IP address match the MAC and IP address of PE router 10B, which is included in the same Ethernet segment 14 as PE router 10A. That is, PE router 10A can determine that PE router 10B is in the same Ethernet segment 14 based on the stored information in PE router 10A that associates the ESI of Ethernet segment 14 with the MAC and IP addresses of PE routers 10A-10B. Based on the information received during the EVPN gateway MAC synchronization process to configure its forwarding plane, PE router 10A may skip decrementing the TTL value of the control plane message from 1 to 0. By refraining from decrementing the TTL value, PE router 10A will not drop the control plane message that is intended for PE router 10B. Instead, PE router 10A will, based on the forwarding next hops configured in its forwarding plane, determine the egress interface corresponding to PE router 10B and forward the control plane message using the determined interface. PE router 10B may receive control plane message from PE router 10A via network link 18A. Thus, PE router 10A was able to successfully route the single-hop layer-3 control packet to PE router 10B by refraining from decrementing the TTL value for IP routes exchanged with EVPN Gateway MAC sync. PE router 10A would continue to perform the TTL decrement for IP routes without the Gateway MAC sync. That is, PE router 10A would decrement the TTL value for ingress network packets that do not specify destination addresses that correspond to PE router within the same Ethernet segment 14.

In some examples, techniques of the disclosure may therefore enable independent routing sessions between customer hosts/network devices and provider hosts/network devices to be established over an all-active multi-home attachment point. In some examples, fewer configuration operations or synchronizations may be required between provider network devices. The techniques of the disclosure may, in some examples, be transparent to the customer network. In some instances, the techniques may not require changes to virtual machine mobility configurations.

Figure 2:
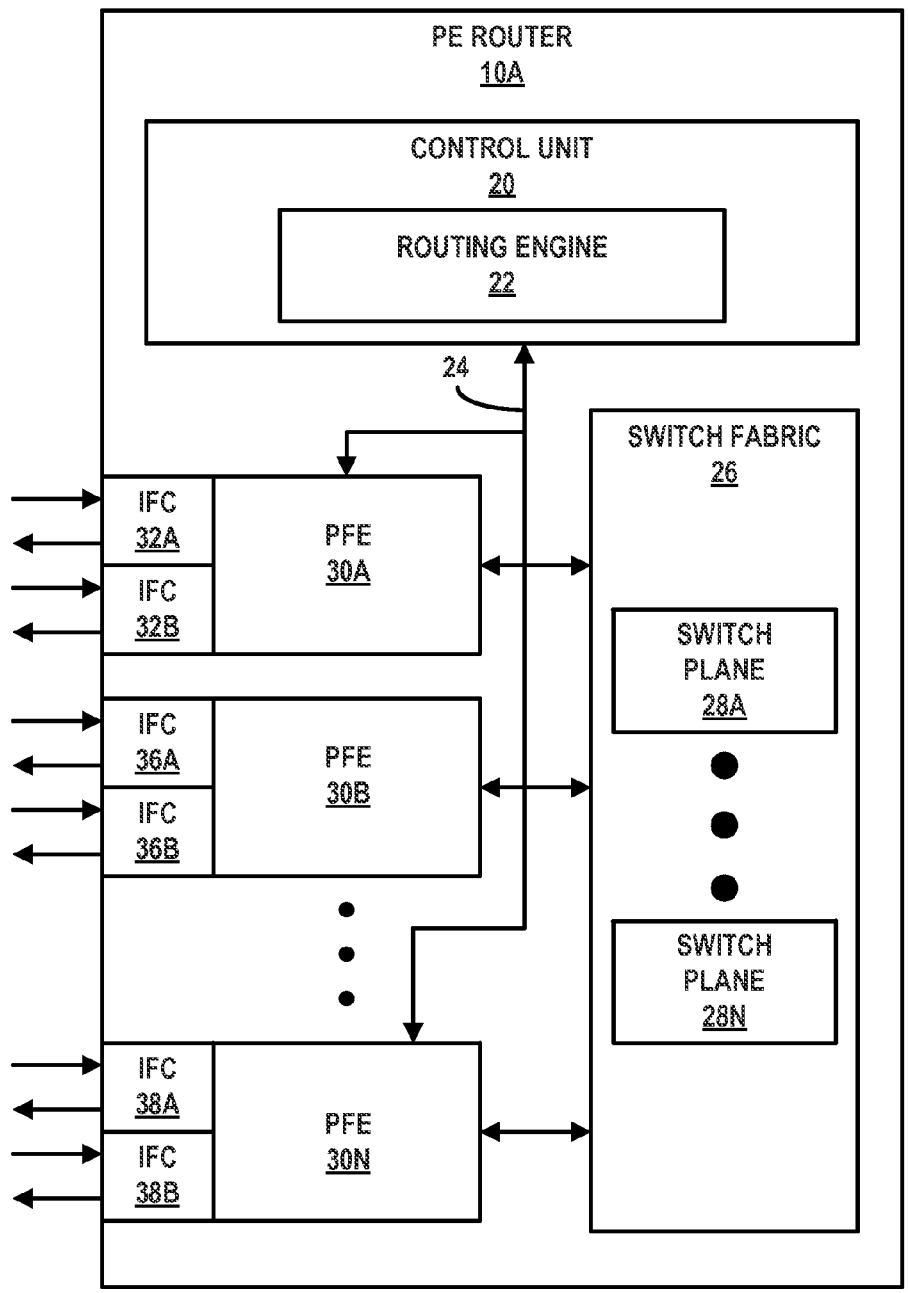
FIG. 2 is a block diagram illustrating example an PE router of FIG. 1 in greater detail, in accordance with techniques of the disclosure.

FIG. 2 is a block diagram illustrating example PE router 10A of FIG. 1 in greater detail, in accordance with techniques of the disclosure. PE router 10A includes control unit 20, switch fabric 26, and PFEs 30A-30N ("PFEs 30"), capable of implementing techniques of the disclosure. PFEs 30 may receive and send data via interface cards 32A-32B, 36A-36B, and 38A-38B ("IFCs 32", "IFCs 36", and "IFCs 38", respectively). In other embodiments, each of PFEs 30 may comprise more or fewer IFCs. Switch fabric 26 provides an interconnect mechanism for forwarding data between PFEs 30 for transmission over a network, e.g., the Internet.

Routing engine 22 maintains routing tables, executes routing protocol and controls user access to PE router 10A. In this example, routing engine 22 is connected to each of PFEs 30 by a dedicated link 24, which may be an internal Ethernet link. For example, dedicated link 24 may comprise a 100 Mbps Ethernet connection. Routing engine 22 maintains routing information that describes a topology of a network, and derives a forwarding information base (FIB) in accordance with the routing information. Routing engine 22 copies the FIB to each of PFEs 30. This allows the FIB in each of PFEs 30 to be updated without degrading packet forwarding performance of PE router 10A. Alternatively, routing engine 22 may derive separate FIBs which are copied to respective PFEs 30.

Control unit 20 provides an environment for storing L2 network topology information, e.g., spanning tree information, executing CFM protocols to provide fault isolation and detection over large L2 networks, and providing a management interface to allow user access and configuration of PE router 10A. The operating environment of control unit 20 may be implemented solely in software, or hardware, or may be implemented as a combination of software, hardware or firmware. For example, control unit 20 may include one or more processors which execute software instructions. In that case, control unit 20 may include various software modules or daemons, and may include a computer-readable storage medium, such as computer memory or hard disk, for storing executable instructions.

In a routing node, a "switch plane" is generally capable of providing a communication path between any two of PFEs 30. In this example, switch fabric 26 consists of multiple standalone switch planes 28A through 28N ("switch planes 28"). In some embodiments, each of switch planes 28 is provided by one or more switch fabric chips on one or more separate, removable switch cards. Other routing nodes that implement the techniques described herein may comprise additional or fewer switch planes, including a single switch plane. A majority of the switch planes may be active at any given time with data packets distributed over the active switch planes. The inactive switch plane(s) of switch fabric 26 serves as back-up switch plane(s) such that if one or more of the active switch planes goes offline, the back-up switch plane(s) automatically activate, and the bandwidth capacity of PE router 10A is not diminished. The back-up switch plane(s)

may be identical to the active switch planes and act as hot spare(s) to maintain bandwidth capacity in the event that one or more of the active switch planes fail. Each of switch planes 28 is operationally independent; therefore, PE router 10A may continue to forward packets as long as at least one of switch planes 28 remain active, but possibly at a reduced bandwidth capacity.

As part of a standalone router, switch planes 28 form a standalone switch fabric 26. That is, each of switch planes 28 is capable of providing a connection between any of PFEs 30 within PE router 10A. In this manner, switch planes 28 form a standalone switch fabric that enables packet forwarding between the plurality of PFEs 30 of PE router 10A. For example, switch fabric 26 may be provided by a set of removable switch cards, where each removable switch card provides a respective one of switch planes 28.

As shown in FIG. 2, PFE 30A and PFE 30B may be ingress PFEs that receive network packets at one or more of interfaces 32A-32B and 36A-36B, respectively. Ingress PFEs 30A and 30B may route the network packets to PFE 30N, which may be an egress PFE. Consequently, egress PFE 30 may route network packets to other network devices via one or more of network interfaces 38A-38B.

In accordance with techniques of the disclosure, routing engine 22, at initial configuration and startup, may generate and send an Ethernet Auto-Discovery route to CE device 8A that indicates the availability of PE router 10A in Ethernet segment 14. In addition, routing engine 22 may perform an EVPN gateway MAC synchronization process with PE routers 10B-10C in Ethernet segment 14. Specifically, routing engine 22 may generate control plane messages that are destined for PE routers 10B-10C. The control plane messages may include, among other information, the MAC and IP addresses of PE router 10A. Upon generating the messages, routing engine 22 may send the messages to one or more of PFEs 30A-30N. PFEs 30A-30N may perform a lookup and forward the messages out the respective egress interfaces to PE routers 10B-10C.

As a part of the EVPN gateway MAC synchronization process, PE router 10A may similarly receive such control plane messages that include information indicating the MAC and IP addresses of PE routers 10B-10C. Specifically, one or more of PFEs 30A-30N may receive such control plane messages at ingress interfaces. Upon the one or more of PFEs 30A-30N performing ingress lookups on the control plane messages, routing engine 22 may receive the contents of the control plane messages. Routing engine 22 may determine the MAC and IP addresses from the contents of the control plane message that correspond to PE routers 10B-10C. Upon determining the addresses, routing engine 22 may update forwarding information maintained by routing engine 22 to indicate the respective MAC and IP addresses are associated PE routers 10B-10C.

Routing engine 22, may configure the forwarding plane of PE router 10A based on the updated forwarding information. A forwarding plane may generally refer to software and/or hardware components of a network device used to forward Ethernet frames and/or network packets, and may include, for example, packet forwarding engines (e.g., PFEs 30A-30N), a switch fabric (e.g., switch fabric 26) that operatively couples the packet forwarding engines, interfaces (e.g., IFCs 32, 36, 38) coupled to the packet forwarding engines, and forwarding information. In particular, routing engine 22 configures one or more of PFEs 30A-30N to identify network packets that have destination addresses that match MAC and IP addresses of PE routers 10B-10C in Ethernet segment 14.

As one example of configuring the forwarding plane, routing engine 22 may, based on the forwarding information, configure PFE 30A to identify network packets having a MAC and IP address that matches the MAC and IP address of at least one of PE router 10B and 10C. That is, routing engine 22 may configure PFE 30A to perform an ingress lookup and determine whether the destination MAC and IP addresses of a network packet match the MAC and IP addresses of PE router 10B and 10C. To perform an ingress lookup, PFE 30A may include one or more chained next hops that are executed when the lookup is performed and resolves the destination MAC and IP address information included in the header of a network packet. Generally, a chained next hop includes a group of one or more next hops, wherein each next hop includes a group of one or more instructions that are executed by the packet forwarding engine. In particular, routing engine 22 may configure PFE 30A such that one or more chained next hops that correspond to the MAC and IP address of PE router 10B, when executed, cause PFE 30A to skip decrementing the TTL value of a network packet having the same MAC and IP address as PE router 10B. The final next hop in the chained next hops may specify the egress interface of PE router 10A's forwarding plane that is operatively coupled to PE router 10B. Consequently, when PFE 30A performs an ingress lookup based on the destination MAC and IP address of a network packet and determines a match with PE router 10B, PFE 30A may skip decrementing the TTL value of the network packet and forward the network packet out the egress interface that corresponds to PE router 10B. PE router 10A may similarly configure its forwarding plane to skip decrementing TTL values of network packets having MAC and IP addresses that match PE router 10C.

In one example, customer equipment 4A may initially send a unicast ISIS control plane message to CE device 8A that includes a destination MAC and IP address of PE router 10B. CE device 8A, configured to use Ethernet segment 14 in active-active mode, may be executing a load-balancing algorithm that evenly distributes the flow of network packets to each of PE routers 10A-10C. Upon receiving the network packet, CE device 8A may apply a hash function to the destination MAC and IP address of the control plane message. CE device 8A may determine that the resulting hashcode corresponds to an egress interface that operatively couples CE device to PE router 10A. Consequently, CE device 8A forwards the control plane message to PE router 10A rather than the intended destination PE router 10B.

PFE 30A initially receives the network packet at IFC 32A. Responsive to receiving the control plane message, PFE 30A performs an ingress lookup based information included in the header of the control plane message. Specifically. PFE 30A may perform an ingress lookup by traversing a radix tree or other suitable data structure. By traversing through the radix tree using the MAC and IP address, PFE 30A may resolve to a group of chained next hops. Based on the information received during the EVPN gateway MAC synchronization process to configure its forwarding plane, the chained next hops may specify skipping a decrement of the TTL value of the network packet. By refraining from decrementing the TTL value, PFE 30A will not drop the control plane message that is intended for PE router 10B. Instead, PFE 30A will, based on a next hop in the chained next hops, determine the egress interface (e.g., IFC 32B) corresponding to PE router 10B and forward the control plane message using the determined interface. PE router 10B may receive control plane message from PE router 10A via network link 18A. Thus, the forwarding plane of PE router 10A was able to successfully route the single-hop layer-3 control packet to PE router 10B by refraining from decrementing the TTL value for IP routes exchanged with EVPN Gateway MAC sync. PFE 30A would continue to perform the TTL decrement for IP routes without the Gateway MAC sync. That is, PFE 30A would decrement the TTL value for ingress network packets that do not specify destination addresses that correspond to PE router within Ethernet segment 14.

As described in FIG. 1, techniques of the disclosure have been described for example purposes with respect to EVPN environments; however, the techniques may be applicable in other layer 2 all-active configurations. For instance, techniques described herein can be used for other all-active multi-homing techniques, such as Multi-Chassis Link Aggregation Groups (LAG). In the case of Multi-Chassis LAG (MCLAG), a MCLAG-ID may be an identifier that identifies a LAG in a similar manner to the way in which an Ethernet Segment Identifier identifies an Ethernet segment. Each network device in a LAG may perform ICCP procedures to exchange gateway MAC and gateway IP addresses in a similar fashion as by BGP in EVPN. Once the gateway MAC and gateway IP information is available, a network device in the LAG may install an IP route for gateway IP together with one or more additional operations to skip a TTL decrement for that route. Thus, in some examples, each network device may store associations between identifiers such as MAC and IP addresses of other network devices in a LAG along with an MCLAG-ID that identifies the LAG that includes each of the network devices. Consequently, if a network packet is received by a network device in the LAG at one of its ingress interfaces that is operatively coupled to a multi-homed network device of the LAG, and the network packet is destined to another network device in the same multi-homed group (e.g., same LAG), the receiving network device may refrain from decrementing the TTL value of the network packet and forward it to the destination network device In operation, a group of network devices each executing a Multi-Chassis LAG protocol may initially participate in an Inter-Control Center Communications Protocol (ICCP) synchronization process. The network devices may provide an all-active configuration in which the network devices collectively operate as a single, logical network link to comprise the LAG. During the ICCP process, a first network device in the LAG may receive from a second network device the LAG, a control plane message comprising a first identifier that identifies that second network device. In some examples, the first identifier may be a MAC address, IP address, or any other suitable identifier or combination of identifiers that identify the second network device in the LAG. The first network device may store an association between the first identifier and a MCLAG-ID of the LAG that includes the first and second network devices. The first network device may similarly send to the second network device, a control plane message comprising at least one identifier that identifies that first network device.

The first network device in the LAG may configure, based at least in part on the control plane message, its forwarding plane to identify network packets having a second identifier that matches the first identifier. The second identifier may be a destination MAC address, destination IP address, or any other suitable identifier or combination of identifiers that identify a destination network device for the network packet. To configure the control plane, the first network device may configure one or more forwarding next hops to skip a decrement of the TTL value of a network packet having a second identifier (or one or more identifiers) that matches the first identifier (or one or more identifiers) received during the ICCP process, and forwarding the network packet to the second PE network device. In some examples, the first network device may configure its forwarding plane to skip a decrement of the TTL value of a network packing having destination MAC and IP addresses that match the MAC and IP addresses of the second network device in the same LAG.

In one example, the first network device of the LAG may generate a first next hop that when processed by the first network device, causes the first network device to skip decrementing the TTL value of the network packet. The first network device may also generate a second next hop indicating an egress interface of the first network device that when processed by the first network device, causes the first network device to forward the network packet to the second network device using the egress interface. The first network device may then configure at least one packet forwarding engine of the forwarding plane to process a group of chained next hops that include the first and second next hops when the second identifier of the network packet matches the first identifier that identifies the second network device that is in the same LAG as the first network device.

As previously described above, the network devices in the LAG may be configured to appear as a single logical link to a remote (or third) network device that is operatively coupled to each of the network devices in the LAG. The remote network device may be executing a load-balancing algorithm that distributes network traffic to each of the network devices in the LAG. In one example, the remote network device may receive a control plane message with a TTL value of 1 from a host or other network device that is destined for the second network device in the LAG. Due to the load-balancing algorithm, the remote network device may send the network packet to the first network device in the LAG rather than the second network device.

Responsive to receiving the control plane message, the first network device of the LAG may determine the control plane message includes destination MAC and IP addresses that match the MAC and IP addresses that identify the second PE network device included in the same LAG as the first network device. For instance, upon receiving the control plane message, the first network device may perform an ingress lookup based on the destination MAC and IP addresses of the control plane message. The ingress lookup may correspond to the next hops (e.g., chained next hops) that were previously configured by the first network device based on the information received from the second network device during the ICCP synchronization process. Based on the chained next hops, the first network device of the LAG skips a decrement of the TTL value of the control plane message and forwards the network packet to the second network device because the second network device is in the same LAG as the first network device. Although the previous example described matching a MAC and IP address to skip the TTL decrement, any number of one or more identifiers may be compared to identify a match in order determine that the network packet is destined for a destination network device that is in the same LAG as the receiving network device that received the network packet. In other examples, responsive to determining that the second identifier of the network packet does not match the first identifier that identifies the second network device in the same LAG, the first network device may decrement the TTL value of the network packet.

Figure 3:
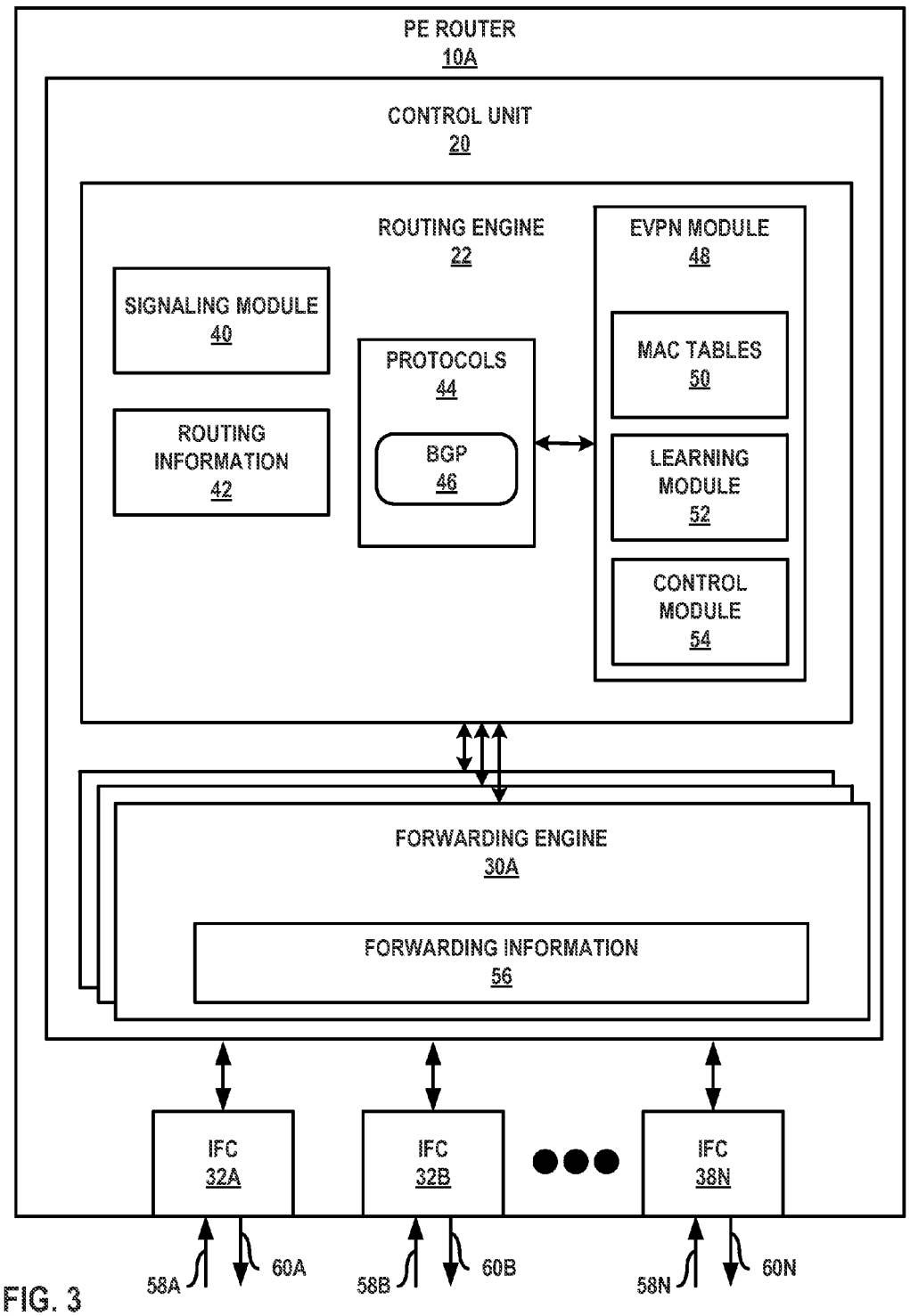
FIG. 3 is a block diagram illustrating further details of a PE router that provides improved control plane messaging in an active-active (or all-active) configuration of a multi-homed EVPN environment, in accordance with techniques of the disclosure.

FIG. 3 is a block diagram illustrating further details of a PE router that provides improved control plane messaging in an active-active (or all-active) configuration of a multi-homed EVPN environment, in accordance with techniques of the disclosure. PE router 10A includes a control unit 20 that includes a routing engine 22 coupled to forwarding engines 30A-30N (e.g., packet forwarding engines or PFEs). PE router 10A includes interface cards 32A-38N ("IFCs 38") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof.

Routing engine 22 provides an operating environment for various protocols 44 that execute at different layers of a network stack. The protocols may be software processes executing on one or more processors. For example, routing engine 22 includes network protocols that operate at a network layer of the network stack. In the example of FIG. 3, network protocols include the Border Gateway Protocol (BGP) 46, which is a routing protocol. Routing engine 22 may include other protocols not shown in FIG. 3. Routing engine 22 is responsible for the maintenance of routing information 42 to reflect the current topology of a network and other network entities to which PE router 10A is connected. In particular, routing protocols periodically update routing information 42 to accurately reflect the topology of the network and other entities based on routing protocol messages received by PE router 10A.

Forwarding engines 30A-30N ("forwarding engines 30") represent hardware and logic functions that provide high-speed forwarding of network traffic. Forwarding engines 30 typically includes a set of one or more forwarding chips programmed with forwarding information that maps network destinations with specific next hops and the corresponding output interface ports. In general, when PE router 10A receives a packet via one of inbound links 58, one of forwarding engines 30 identifies an associated next hop for the data packet by traversing the programmed forwarding information based on information within the packet. One of forwarding engines 30 (either the ingress forwarding engine or a different egress forwarding engine) forwards the packet on one of outbound links 60 mapped to the corresponding next hop.

In the example of FIG. 3, forwarding engine 30A includes forwarding information 56. In accordance with routing information 42, forwarding engine 30A maintains forwarding information 56 that associates network destinations with specific next hops and corresponding interface ports. For example, routing engine 22 analyzes routing information 42 and generates forwarding information 56 in accordance with routing information 42. Forwarding information 56 may be maintained in the form of one or more tables, link lists, radix trees, databases, flat files, or any other data structures.

Forwarding engine 30A maintains forwarding information 56 for each Ethernet Virtual Instance (EVI) established by PE router 10A to associate network destinations with specific next hops and the corresponding interface ports. As described in FIG. 1, an EVI may define one or more Ethernet Segments in an EVPN. In general, when PE router 10A receives a data packet on an LSP of a given EVI via one of inbound links 58, forwarding engine 30A, for example, identifies an associated next hop for the data packet by traversing forwarding information 56 based on information (e.g., labeling information) within the packet. Forwarding engine 30A forwards the data packet on one of outbound links 60 to the corresponding next hop in accordance with forwarding information 56 associated with the EVI. At this time, forwarding engine 30A may push and/or pop labels from the packet to forward the packet along a correct LSP.

Control unit 42 also includes an EVPN module 48 having a flooding module 54 that performs flooding and a learning module 52 that performs layer two (L2) learning, e.g., learning of customer device MAC addresses from inbound LSPs and association of those customer MAC addresses with corresponding outbound LSPs and output interfaces. EVPN module 48 may maintain MAC tables 50 for each EVI established by PE router 10C, or in alternative examples may maintain one or more MAC tables that are independent of each respective EVI. Learning module 52 and flooding module 54 may alternatively reside within forwarding engine 45.

Signaling module 40 outputs control-plane messages to automatically establish LSPs, Ethernet Segments, and otherwise provision one or more EVPNs between PE router 10A and each of the other PE routers 10. Signaling module 40 may signal the PE routers 10 using one or more suitable L3 protocols, such as the BGP. Signaling module 40 can communicate with forwarding engine 30A to automatically update forwarding information 56.

EVPN module 48 executes in the control plane of PE router 10A and performs MAC address learning to automatically update portions of forwarding information 56 for each EVI established by PE router 10A. EVPN module 48 is invoked when PE router 10A receives data packets on the LSPs established by PE router 10A for any of the PE routers 10 that are members of an EVI. EVPN module 48 performs MAC address learning using learning module 52 and updates the one of MAC tables 50 to initially record associations between the LSPs connected to PE router 10A and the source MAC addresses of the EVPN customer devices from which the data packets were received on the LSPs. For example, one of MAC tables 50 records information that identifies the LSPs connected to PE router 10A, and records MAC addresses that identify the source customer devices of the data packets transmitted over the LSPs. In effect, PE router 10A, an L3 routing device (or in some examples, an L2 switching device), learns associations between MAC addresses and LSPs (which are mapped to ports), much as an L2 switch learns associations between MAC addresses and ports. Forwarding information 56 may represent a virtual port binding and bridging table.

In order to update one of the MAC tables 50, learning module 52 of EVPN module 48 in routing engine 22 performs L2 learning and association of L2 customer MAC addresses with specific LSPs. Learning module 52 then communicates information recorded in the one of MAC tables 50 to configure forwarding information 56. In this way, forwarding engine 30A may be programmed with associations between each LSP and output interface and specific source customer MAC addresses reachable via those LSPs. EVPN module 48 may communicate with forwarding engines 30 to update the one of MAC tables 50 associated with the EVPN to associate the customer MAC addresses with the appropriate outbound LSP. After the update, MAC tables 50 include associations between the LSPs connected to PE router 10A that are used to transport L2 traffic to the MAC addresses of the customer devices.

In some examples, techniques of the present disclosure may be implemented in control module 54 of EVPN module 48. For instance, at initial configuration and startup, control module 54 may generate a message using BGP 46 indicating an Ethernet Auto-Discovery route that indicates the availability of PE router 10A in Ethernet segment 14. Signaling module 40 may send the message to forwarding engine 30A, which in turn forwards the message indicating the Ethernet Auto-Discovery route to CE device 8A. CE device 8A, receiving the Ethernet Auto-Discovery route may update its forwarding information according to indicate the PE router 10A is included in Ethernet segment 14.

Control module 54 may also initiate and control an EVPN gateway MAC synchronization process with PE routers 10B-

10C in Ethernet segment 14. Specifically, control module 54 may use BGP 46 to generate control plane messages that are destined for PE routers 10B-10C. The control plane messages may include, among other information, the MAC and IP addresses of PE router 10A. Upon generating the messages, signaling module 40 may send the messages to PFE 30A. PFE 30A may perform a lookup and forward the messages out the respective egress interfaces to PE routers 10B-10C.

As a part of the EVPN gateway MAC synchronization process, PE router 10A may similarly receive such control plane messages that include information indicating the MAC and IP addresses of PE routers 10B-10C. Specifically, one or more of PFEs 30A-30N may receive such control plane messages at ingress interfaces. Upon the one or more of PFEs 30A-30N performing ingress lookups on the control plane messages based on forwarding information 56, control module 54 may receive the contents of the control plane messages. Control module 54 may determine the MAC and IP addresses from the contents of the control plane message that correspond to PE routers 10B-10C. Upon determining the addresses, routing engine 22 may update routing information 42 maintained by routing engine 22 to indicate the respective MAC and IP addresses are associated PE routers 10B-10C.

Based on the updated routing information 42, signaling module 40 may configure the forwarding information of PFE 30A. In particular, signaling module 40 configures one or more of PFEs 30A-30N to identify network packets that have destination addresses that match MAC and IP addresses of PE routers 10B-10C in Ethernet segment 14. To configure PFE 30A, signaling module 40 may configure forwarding information 56 of PFE 30A to identify network packets having a MAC and IP address that matches the MAC and IP address of at least one of PE router 10B and 10C. That is, signaling module 40 may configure forwarding information 30A to cause PFE 30A to perform an ingress lookup and determine whether the destination MAC and IP addresses of a network packet match the MAC and IP addresses of PE router 10B and 10C.

To perform an ingress lookup, forwarding information 56 may include data that define one or more chained next hops that are executed when the lookup is performed and PFE 30A resolves the destination MAC and IP address information included in the header of a network packet. Forwarding information 56 may define one or more chained next hops that correspond to the MAC and IP address of PE router 10B. When PFE 30A is configured in based on forwarding information 56 and the chained next hops are executed, PFE 30A may skip decrementing the TTL value of a network packet having the same MAC and IP address as PE router 10B. The final next hop in the chained next hops may specify the egress interface of PFEs 30A-30N that is operatively coupled to PE router 10B. Consequently, when PFE 30A performs an ingress lookup based on the destination MAC and IP address of a network packet and determines a match with PE router 10B, PFE 30A may skip decrementing the TTL value of the network packet and forward the network packet out the egress interface that corresponds to PE router 10B. PE router 10A may similarly configure one or more of PFEs 30A-30N to skip decrementing TTL values of network packets having MAC and IP addresses that match PE router 10C.

To further illustrate the operation of PE router 10A in FIG. 3, customer equipment 4A may initially send a unicast OSPF control plane message to CE device 8A that includes a destination MAC and IP address of PE router 10B. CE device 8A, configured to use Ethernet segment 14 in active-active mode, may be executing a load-balancing algorithm that evenly distributes the flow of network packets to each of PE routers 10A-10C. Upon receiving the network packet, CE device 8A may apply a hash function to packet header information of the control plane message. CE device 8A may determine that the resulting hashcode corresponds to an egress interface that operatively couples CE device to PE router 10A. Consequently, CE device 8A forwards the control plane message to PE router 10A rather than the intended destination PE router 10B.

PFE 30A initially receives the network packet at IFC 32A. Responsive to receiving the control plane message, PFE 30A performs an ingress lookup based information included in the header of the control plane message. Specifically, PFE 30A may perform an ingress lookup by traversing a radix tree or other suitable data structure. By traversing through the radix tree using the MAC and IP address, PFE 30A may resolve to a group of chained next hops. Based on the information received during the EVPN gateway MAC synchronization process to configure its forwarding plane, the chained next hops may specify skipping a decrement of the TTL value of the network packet. By refraining from decrementing the TTL value, PFE 30A will not drop the control plane message that is intended for PE router 10B. Instead, PFE 30A will, based on a next hop in the chained next hops, determine the egress interface (e.g., IFC 32B) corresponding to PE router 10B and forward the control plane message using the determined interface. PE router 10B may receive control plane message from PE router 10A. Thus, PFE 30A was able to successfully route the single-hop layer-3 control packet to PE router 10B by refraining from decrementing the TTL value for IP routes exchanged with EVPN Gateway MAC sync. PFE 30A would continue to perform the TTL decrement for IP routes without the Gateway MAC sync. That is, PFE 30A would decrement the TTL value for ingress network packets that do not specify destination addresses that correspond to PE router within Ethernet segment 14.

The techniques described herein do not require modifications to BGP signaling for the EVPN. If a PE router configured as described herein encounters another PE router that does not support this feature, the configured PE router operates according to the conventional operation. The architecture of PE router 10A illustrated in FIG. 3 is shown for exemplary purposes only. The disclosure is not limited to this architecture. In other embodiments, PE router 10A may be configured in a variety of ways. In one embodiment, for example, some of the functionally of routing engine 22 and forwarding engines 30 may be distributed within IFCs 32.

Elements of control unit 20 may be implemented solely in software, or hardware, or may be implemented as combinations of software, hardware, or firmware. For example, control unit 20 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 20 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE router 10C, e.g., protocols. Control unit 20, in some examples, retrieves and executes the instructions from memory for these aspects.

Figure 4:
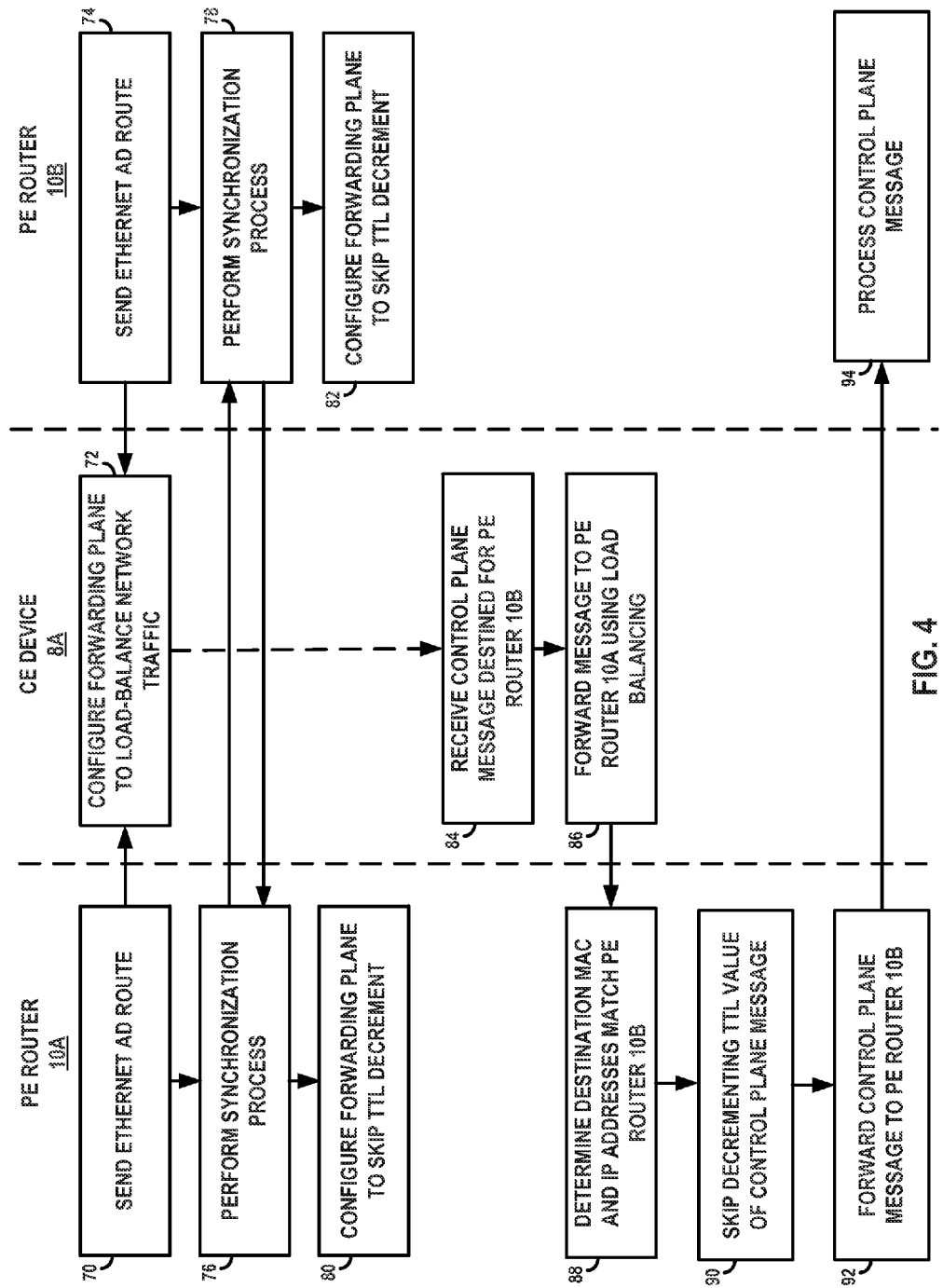
FIG. 4 is a flowchart illustrating example operations for providing control plane messaging in an active-active (or all-active) configuration of a multi-homed EVPN environment, in accordance with techniques of the disclosure.

FIG. 4 is a flowchart illustrating example operations for providing control plane messaging in an active-active (or all-active) configuration of a multi-homed EVPN environment, in accordance with techniques of the disclosure. Example operations in accordance with techniques of the disclosure are illustrated for example purposes with respect to PE router 10A, PE router 10B configured for a given EVI one or more EVIs of Ethernet segment 14 and CE router 8A. As shown in FIG. 4, PE router 10A may, at initial configuration and startup, generate and send an Ethernet Auto-Discovery route to CE device 8A that indicates the availability of PE router 10A in Ethernet segment 14 (70). Similarly, PE router 10B may also generate and send an Ethernet Auto-Discovery route to CE device 8A that indicates the availability of PE router 10B in Ethernet segment 14 (76). CE device 8A may receive the respective Ethernet Auto-Discovery routes and configure its forwarding plane to load-balance network traffic to PE routers 10A and 10B (72).

In addition, PE routers 10A, 10B may perform an EVPN synchronization process (76, 78). Specifically, PE routers 10A generates a control plane message that is destined for PE router 10B and PE router 10B generates a control plane message that is destined for PE router 10A. The control plane messages may include, among other information, the MAC and IP addresses that identify the respective PE router that generated the message. Upon generating the messages, PE router 10A may send its control plane message to PE router 10B, PE router 10B may send its control plane message to PE router 10A.

PE router 10A may receive the control plane message from PE router 10B. Routing engine 22, may configure the forwarding plane of PE router 10A based on the information included in the control plane message received from PE router 10B (80). PE router 10A may, based on the information, configure its forwarding plane to identify network packets having a MAC and IP address that matches the MAC and IP address of PE router 10B. That is, PE router 10A may configure its forwarding plane to perform an ingress lookup and determine whether the destination MAC and IP addresses of a network packet match the MAC and IP addresses of PE router 10B. PE router 10A may configure its forwarding plane such that one or more chained next hops that correspond to the MAC and IP address of PE router 10B, when executed, cause PE router 10A to skip decrementing the TTL value of a network packet having the same MAC and IP address as PE router 10B. Consequently, when PE router 10A performs an ingress lookup based on the destination MAC and IP address of a network packet and determines a match with PE router 10B, PE router 10A may skip decrementing the TTL value of the network packet and forward the network packet out the egress interface that corresponds to PE router 10B. PE router 10B may similarly configure its forwarding plane to skip decrementing TTL values of network packets having MAC and IP addresses that match PE router 10A (82).

CE device 8A may receive a unicast ISIS control plane message that includes a destination MAC and IP address of PE router 10B (84). CE device 8A, configured to use Ethernet segment 14 in active-active mode, may be executing a load-balancing algorithm that evenly distributes the flow of network packets. Upon receiving the network packet. CE device 8A may apply a hash function to the destination MAC and IP address of the control plane message. CE device 8A may determine that the resulting hashcode corresponds to an egress interface that operatively couples CE device to PE router 10A. Consequently, CE device 8A forwards the control plane message to PE router 10A rather than the intended destination PE router 10B (86).

PE router 10A initially receives the control plane message. Responsive to receiving the control plane message, PE router 10A determines the destination MAC and IP address of the control plane message and performs an ingress lookup (88). Based on the information received during the EVPN gateway MAC synchronization process to configure its forwarding plane, the chained next hops corresponding to the ingress lookup may specify skipping a decrement of the TTL value of the network packet (90). By refraining from decrementing the TTL value, PE router 10A will not drop the control plane message that is intended for PE router 10B. PE router 10A, instead, forwards the control plane message to PE router 10B based on the chained-next hops (92). PE router 10B may receive control plane message from PE router 10A and process the control plane message accordingly (94).

Figure 5:
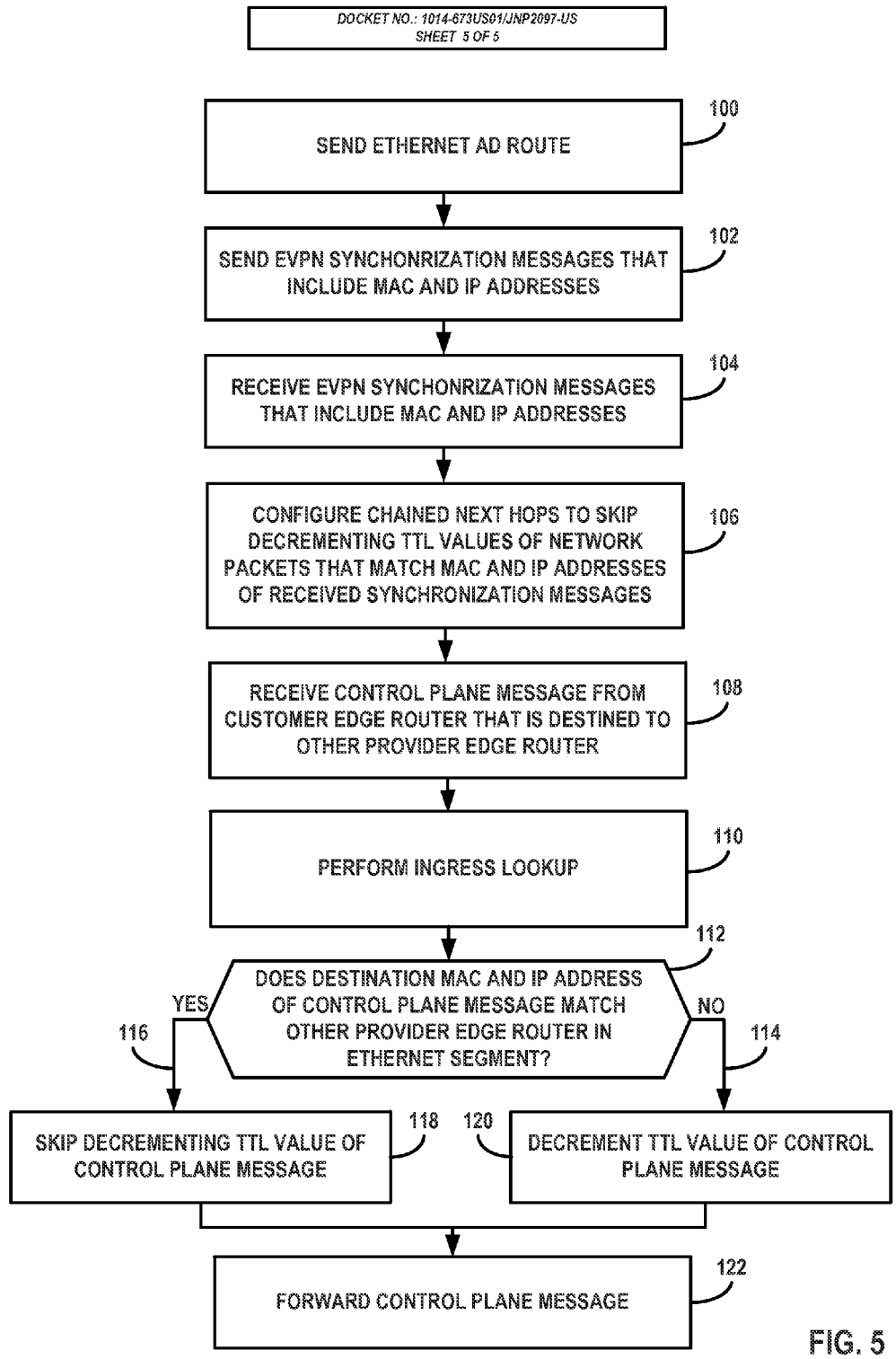
FIG. 5 is a flowchart illustrating example operations of a network for providing control plane messaging in an active-active (or all-active) configuration of a multi-homed EVPN environment, in accordance with techniques of the disclosure.

FIG. 5 is a flowchart illustrating example operations of a network for providing control plane messaging in an active-active (or all-active) configuration of a multi-homed EVPN environment, in accordance with techniques of the disclosure. Example operations in accordance with techniques of the disclosure are illustrated for example purposes with respect to PE router 10A and system 2 as previously described herein. Initially, during configuration and startup, PE router 10A generates and sends an Ethernet Auto-Discovery route to CE device 8A that indicates the availability of PE router 10A in Ethernet segment 14 (100).

PE router 10A may also perform an EVPN gateway MAC synchronization process with PE routers 10B-10C in Ethernet segment 14. For instance, PE router 10A may generate control plane messages that are destined for PE routers 10B-10C. The control plane messages may include, among other information, the MAC and IP addresses of PE router 10A. Upon generating the messages, PE router 10A may send the messages to PE routers 10B-10C (102). As a part of the EVPN gateway MAC synchronization process, PE router 10A may similarly receive such control plane messages that include information indicating the MAC and IP addresses of PE routers 10B-10C (104).

Upon determining the addresses specified in the control plane messages, PE router 10A may update its forwarding to indicate the respective MAC and IP addresses are associated PE routers 10B-10C. As one example of configuring the forwarding plane, PE router 10A may configure its forwarding plane to identify network packets having a MAC and IP address that matches the MAC and IP address of at least one of PE router 10B and 10C. That is, PE router 10A may configure its forwarding plane to perform an ingress lookup and determine whether the destination MAC and IP addresses of a network packet match the MAC and IP addresses of PE router 10B and 10C. To perform an ingress lookup, PE router 10A may configure its forwarding plane to include one or more chained next hops that are executed when the lookup is performed and resolves the destination MAC and IP address information included in the header of a network packet (106).

PE router 10A may configure its forwarding plane such that one or more chained next hops that correspond to the MAC and IP addresses of PE routers 10B and 10C, when executed, cause PE router 10A to skip decrementing the TTL value of a network packet having the same MAC and IP address as PE routers 10B or 10C. The final next hop in the chained next hops may specify the egress interface of PE router 10A's forwarding plane that is operatively coupled to a respective one of PE routers 10B. 10B. Consequently, when PE router 10A performs an ingress lookup based on the destination MAC and IP address of a network packet and determines a match with PE router 10B or 10C, PE router 10A may skip decrementing the TTL value of the network packet and forward the network packet out the egress interface that corresponds to the respective one of PE routers 10B or 10C.

Customer equipment 4A may initially send a unicast ISIS control plane message to CE device 8A that includes a destination MAC and IP address of PE router 10B. CE device 8A may forward the control plane message to PE router 10A rather than the intended destination PE router 10B due to the use of a load-balancing algorithm. PE router 10A initially receives the control plane message (also generally referred to as a network packet) (108). Responsive to receiving the control plane message, PE router 10A performs an ingress lookup based information included in the header of the control plane message (110). Specifically, PE router 10A may perform an ingress lookup by traversing a radix tree or other suitable data structure. PE router 10 determines, based on the ingress lookup, whether the destination MAC and IP address of the control plane message matches the MAC and IP address of one of PE router 10B or 10C (112).

If PE router 10 determines, based on the ingress lookup, that the destination MAC and IP address of the control plane message matches the MAC and IP address of one of PE router 10B or 10C (116), PE router 10A may process corresponding chained next hops to skip a decrement of the TTL value of the control plane message (18). By refraining from decrementing the TTL value, PE router 10A will not drop the control plane message that is intended for PE router 10B. Instead, PE router 10A will, based on a next hop in the chained next hops, determine the egress interface corresponding to PE router 10B and forward the control plane message using the determined interface (122).

Alternatively, if PE router 10A determines, based on the ingress lookup, that the destination MAC and IP address of the control plane message does not match the MAC and IP addresses PE routers 10B and 10C (114), PE router 10A may process corresponding chained next hops to perform a decrement of the TTL value of the control plane message (114). PE router 10A will, based on a next hop in the chained next hops, determine the egress interface corresponding to the host or network device indicated by the MAC and IP address, and forward the control plane message using the determined interface (122).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:
1. A method comprising:
receiving, by a first provider edge (PE) network device and from a second PE network device of a plurality of PE network devices that provide an active-active configuration for an Ethernet segment, a control plane message comprising at least one address that identifies that second PE network device;
configuring, by the first PE network device and based at least in part on the control plane message, a forwarding plane of the first PE network device to identify network packets having respective destination addresses that match the at least one address;
responsive to receiving a network packet, determining by the forwarding plane of the first PE network device, that at least one address of the network packet matches the at least one address that identifies the second PE network device; and
responsive to the determination, skipping, by the forwarding plane of the first PE network device, a decrement of the Time-To-Live (TTL) value of the network packet, and forwarding the network packet to the second PE network device.

2. The method of claim 1,
wherein the network packet is received by the first PE network device from a customer edge (CE) network device that is multi-homed to the plurality of PE network devices, and
wherein the CE network device implements at least one load-balancing algorithm to distribute network packets in active-active mode to the plurality of PE network devices in the Ethernet segment.

3. The method of claim 1, wherein determining that at least one address of the network packet matches the at least one address that identifies the second PE network device, comprises:
  determining, by the first PE network device, that a destination MAC address and a destination IP address indicated by the network packet each respectively match a MAC address and an IP address that identify the second PE network device.

4. The method of claim 1, wherein configuring the forwarding plane of the first PE network device to identify network packets having respective destination addresses that match the at least one address further comprises:
  generating, by the first PE network device, a first next hop that when processed by the first PE network device, causes the first PE network device to skip decrementing the TTL value of the network packet;
  generating, by the first PE network device, a second next hop indicating an egress interface of the first PE network device that when processed by the first PE network device, causes the first PE network device to forward the network packet to the second PE network device using the egress interface; and
  configuring, by the first PE network device, at least one packet forwarding engine of the forwarding plane to process a group of chained next hops that include the first and second next hops when the at least one address of the network packet matches the at least one address that identifies the second PE network device.

5. The method of claim 1, wherein receiving the control plane message comprising at least one address that identifies that second PE network device occurs as part of an EVPN synchronization process between the first PE network device and the second PE network device, wherein the method further comprises:
  sending, by the first PE network device and to the second PE network device, a third control plane message comprising at least one address that identifies that first PE network device.

6. The method of claim 1, further comprising:
  responsive to determining that the at least one address of the network packet does not match the at least one address that identifies the second PE network device, decrementing, by the first PE network device, the TTL value of the network packet.

7. The method of claim 1, further comprising:
  sending, by the first PE network device and to a CE network device that is multi-homed to the plurality of PE network devices, an Ethernet Auto-Discovery route that indicates the availability of the first PE network device within the Ethernet segment.

8. The method of claim 1,
  wherein the network packet is received by the first network device from a third edge network device that is multi-homed to the plurality of network devices, and
  wherein the network device implements at least one load-balancing algorithm to distribute network packets to the plurality of network devices operating as a logical network link.

9. The method of claim 1, further comprising:
  responsive to determining that the second identifier of the network packet does not match the first identifier that identifies the second network device, decrementing, by the first network device, the TTL value of the network packet.

10. A network device that is a first provider edge (PE) network device, the network device comprising:
  a network interface that receives, from a second PE network device of a plurality of PE network devices that provide an active-active configuration for an Ethernet segment, a control plane message comprising at least one address that identifies that second PE network device;
  an Ethernet Virtual Private Network (EVPN) module that configures, based at least in part on the control plane message, a forwarding plane of the first PE network device to identify network packets having respective destination addresses that match the at least one address;
  wherein the EVPN module, responsive to receiving a network packet, determines by the forwarding plane of the first PE network device, that at least one address of the network packet matches the at least one address that identifies the second PE network device; and
  wherein the EVPN module, responsive to the determination, skips, by the forwarding plane of the first PE network device, a decrement of the Time-To-Live (TTL) value of the network packet, and forwarding the network packet to the second PE network device.

11. The network device of claim 10,
  wherein the network packet is received by the first PE network device from a customer edge (CE) network device that is multi-homed to the plurality of PE network devices, and
  wherein the CE network device implements at least one load-balancing algorithm to distribute network packets in active-active mode to the plurality of PE network devices in the Ethernet segment.

12. The network device of claim 10,
  wherein the EVPN module is configured to determine that a destination MAC address and a destination IP address indicated by the network packet each respectively match a MAC address and an IP address that identify the second PE network device.

13. The network device of claim 10,
  wherein the EVPN module generates a first next hop that when processed by the first PE network device, causes the first PE network device to skip decrementing the TTL value of the network packet;
  wherein the EVPN module generates a second next hop indicating an egress interface of the first PE network device that when processed by the first PE network device, causes the first PE network device to forward the network packet to the second PE network device using the egress interface; and
  wherein the EVPN module configures at least one packet forwarding engine of the forwarding plane to process a group of chained next hops that include the first and second next hops when the at least one address of the network packet matches the at least one address that identifies the second PE network device.

14. The network device of claim 10,
  wherein the forwarding plane sends, to the second PE network device, a third control plane message comprising at least one address that identifies that first PE network device.

15. The network device of claim 10,
  wherein the forwarding plane, responsive to determining that the at least one address of the network packet does not match the at least one address that identifies the second PE network device, decrements the TTL value of the network packet.

16. The network device of claim 10,
wherein the forwarding plane sends, to a CE network device that is multi-homed to the plurality of PE network devices, an Ethernet Auto-Discovery route that indicates the availability of the first PE network device within the Ethernet segment.

17. A method comprising:
receiving, by a network device and from a second network device of a plurality of network devices that provide an all-active configuration in which the plurality of network devices operate as a logical network link, a control plane message comprising a first identifier that identifies that second network device;
configuring, by the first network device and based at least in part on the control plane message, a forwarding plane of the first network device to identify network packets having a second identifier that matches the first identifier;
responsive to receiving a network packet, determining by the forwarding plane of the first PE network device, the network packet includes the second identifier that matches the first identifier that identifies the second PE network device; and
responsive to the determination, skipping, by the forwarding plane of the first PE network device, a decrement of the Time-To-Live (TTL) value of the network packet, and forwarding the network packet to the second network device.

18. The method of claim 17, wherein the plurality of network devices operate as the logical network link in a Link Aggregation Group (LAG).

19. The method of claim 17, wherein receiving the control plane message comprising the first identifier that identifies that second network device occurs as part of an Inter-Control Center Communications Protocol (ICCP) synchronization process between the first network device and the second network device, wherein the method further comprises:
sending, by the first network device and to the second network device, a third control plane message comprising at least one identifier that identifies that first network device.

20. The method of claim 17, wherein configuring the forwarding plane of the first network device to identify network packets having respective destination addresses that match the at least one address further comprises:
generating, by the first network device, a first next hop that when processed by the first network device, causes the first network device to skip decrementing the TTL value of the network packet;
generating, by the first network device, a second next hop indicating an egress interface of the first network device that when processed by the first network device, causes the first network device to forward the network packet to the second network device using the egress interface; and
configuring, by the first network device, at least one packet forwarding engine of the forwarding plane to process a group of chained next hops that include the first and second next hops when the second identifier of the network packet matches the first identifier that identifies the second network device.

* * * * *